United States Patent [19]

Jaeger

[11] Patent Number: 4,546,657
[45] Date of Patent: Oct. 15, 1985

[54] FORCE GAUGE

[76] Inventor: Ben E. Jaeger, Rte. 2, Box 49, Plano, Ill. 60545

[21] Appl. No.: 633,584

[22] Filed: Jul. 23, 1984

[51] Int. Cl.[4] .............................................. G01L 1/02
[52] U.S. Cl. ................................................ 73/862.58
[58] Field of Search ........... 73/862.58, 862.54, 862.55, 73/862.38

[56] References Cited

U.S. PATENT DOCUMENTS

| | | | |
|---|---|---|---|
| 2,254,656 | 9/1941 | Kennon | 73/862.58 |
| 2,691,301 | 10/1954 | Guest | 73/862.58 |
| 3,812,557 | 5/1974 | Meyer | 73/862.54 |
| 4,232,547 | 11/1980 | Kasper | 73/862.54 |

Primary Examiner—Donald O. Woodiel
Attorney, Agent, or Firm—Gary, Juettner & Pyle

[57] ABSTRACT

A device for measuring forces exerted by the jaws of a chuck under both static and dynamic rotary conditions is characterized by an elongate housing and a piston in a cylinder bore in the housing and extending generally perpendicular thereto. The piston and housing are adapted to be gripped between the jaws of the chuck to pressurize a fluid in the cylinder, and the pressure of the fluid is coupled with a gauge which is moved out of an end of the housing by an amount in accordance with the pressure, and therefore in accordance with the force exerted by the jaws, and a graduated scale on the gauge provides a visual indication of the force.

20 Claims, 6 Drawing Figures

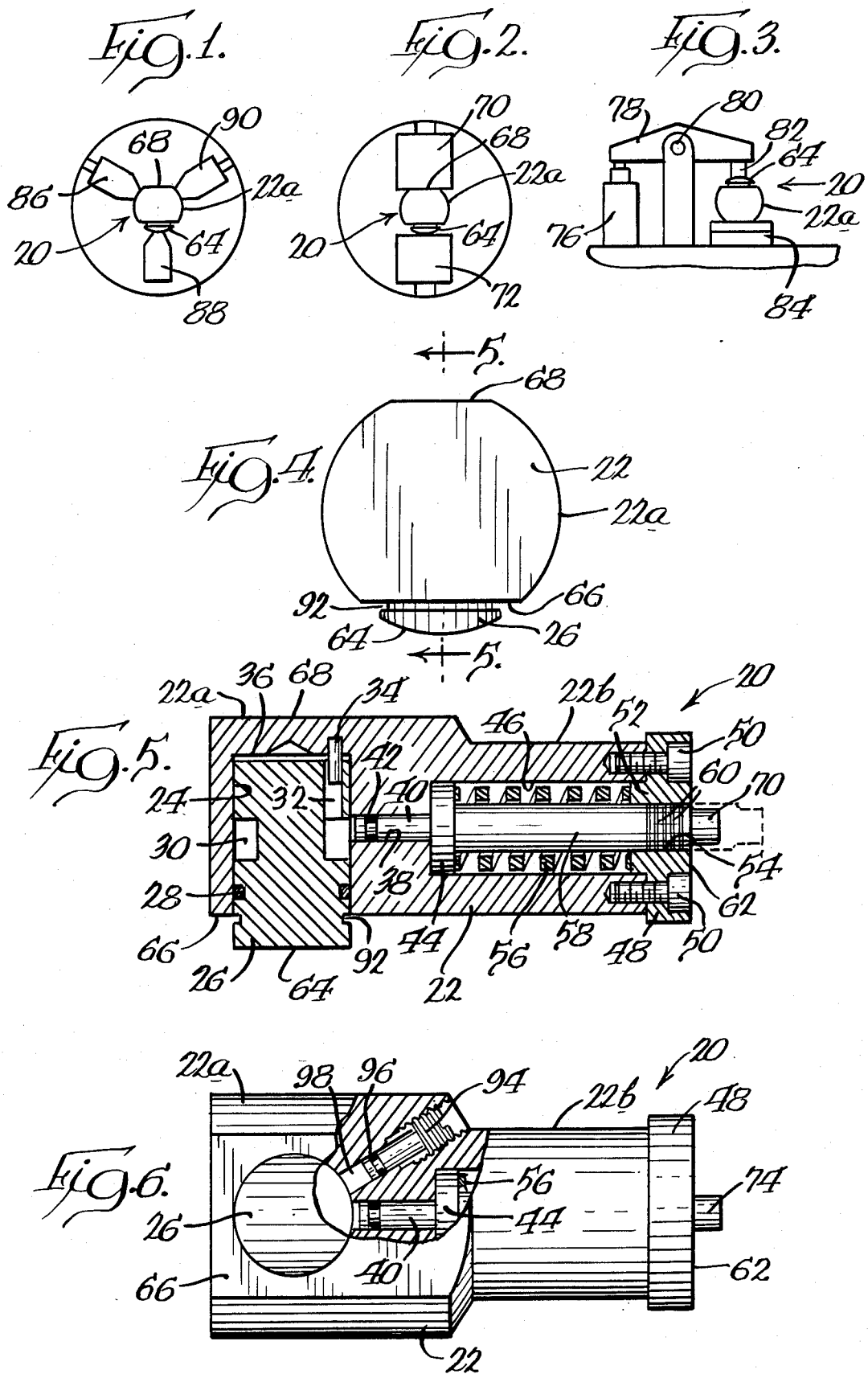

FORCE GAUGE

BACKGROUND OF THE INVENTION

The present invention relates to a force measuring device, and in particular to an improved device for measuring the force exerted by jaws of a chuck under both static and dynamic rotary conditions.

A new power operated chuck, for example a 12" chuck, can be expected to have a maximum static gripping force on the order of 10,000 lbs. However, if the chuck is poorly maintained, the gripping force could drop to only 5,000 lbs. At the same time, gripping pressures decline as spindle speeds increase due to centrifugal force acting on the chuck jaws, and when the chuck rotates at, for example, 2500 rpm, the gripping force may drop another 2,000 lbs. In consequence, the original static gripping force of 10,000 lbs. may in actuality be reduced to about 3,000 lbs. at operating speeds.

Workpiece damage can result not only from insufficient chuck pressure that might allow the workpiece to rotate within the chuck or fly free while turning, but also by excessive pressure which can deform or crush the workpiece. Therefore, it is desirable to periodically test chuck gripping forces, so that any decline resulting from normal wear and lack of maintenance can be detected, promoting working efficiency and operator safety, and also so that excessive gripping pressures can be avoided.

Devices are available for measuring clamping forces. However, they tend to be special purpose devices designed to work with either 2-jaw or 3-jaw clamps. A hydraulic dial gauge may be used to read load, and when the device is used for rotating applications, a rotary pressure joint and torque arm keep the gauge stationary so that it can be read. In the case of electrical-/electromagnetic strain gauge type devices, either a slip-ring rotary joint, a "radio" transmitter or other complex system is required to cope with rotation. Such devices are inherently complex, expensive and often inconvenient to use.

OBJECTS OF THE INVENTION

An object of the present invention is to provide an economical and convenient to use device for measuring clamping forces of vices, hydraulic table clamps and 2 and 3-jaw chucks.

A further object is to provide such a device for measuring clamping forces between parallel jaws or arms of mill vices, bench vices, 2-jaw chucks and clamp dogs.

Another object is to provide such a device for measuring forces exerted by rotating 2 and 3-jaw chucks, such that pressure readings are provided both as the chuck starts rotating and when centrifugal force due to rotation reduces clamping pressures.

SUMMARY OF THE INVENTION

In accordance with the present invention, a gauge for measuring the force exerted by a gripping device comprises an elongate housing having a first cylinder bore therein toward one end thereof extending generally perpendicularly of said housing between an open end on a surface of and a closed end in said housing. A first piston is in and slidably sealed with said cylinder, said piston has an outer end extending out of said cylinder open end and a fluid is in said cylinder for being pressurized upon forceful movement of said piston into said cylinder. In addition, a second cylinder bore is in and extends longitudinally along said housing in communication at one end thereof with said first cylinder and fluid therein, and a second piston is in and slidably sealed with said second cylinder. Said second piston is moved through said second cylinder away from said first cylinder by the pressure of said fluid, and means are provided to progressively resisting increasing movement of said second piston through said second cylinder. Consequently, when said first piston outer end and said housing are gripped by the gripping device, said fluid is pressurized and the amount of movement of said second piston through said second cylinder is in accordance with the force exerted by the gripping device.

Advantageously, indicator means are coupled with said second piston for visually indicating the amount of movement of said second piston through said second cylinder, and therefore the force exerted by the gripping device.

The foregoing and other objects, advantages and features of the invention will become apparent upon a consideration of the following detailed description, when taken in conjunction with the accompanying drawings.

BRIEF DESCRIPTION OF THE DRAWINGS

FIG. 1 illustrates the orientation of the device of the invention when gripped by a 3-jaw chuck for measuring either static or dynamic rotary forces exerted by the jaws;

FIG. 2 illustrates the device in orientation for measuring the clamping forces of a power or manual vise or a 2-jaw chuck under either static or dynamic rotary conditions;

FIG. 3 shows the device measuring clamping forces exerted by a hydraulic table clamp;

FIG. 4 is a front elevation view of the device;

FIG. 5 is a cross sectional side elevation view taken substantially along the lines 5—5 of FIG. 4, illustrating structural details of the device; and FIG. 6 is a partial cross sectional bottom plan view of the device, showing means by which the device may be adjusted.

DETAILED DESCRIPTION

Referring first to FIGS. 4-6, the pressure gauge of the invention is indicated generally at 20 and includes an elongate and cylindrical housing 22 having a major diameter portion 22a toward one end thereof and a minor diameter portion 22b toward an opposite end. An open ended cylinder bore 24 in the housing toward the one end extends generally transversely thereof, a piston 26 carrying an O-ring 28 is in and slidably sealed with the cylinder, and an annular channel 30 is formed circumferentially around a medial portion of the piston. The channel communicates through a passage 32 and around a locating pin 34 with a closed end 36 of the cylinder. The pin prevents rotation of the piston in the cylinder and the annular channel, passage and closed end of the cylinder are filled with hydraulic fluid.

Communicating with the annular channel 30 is a cylinder bore 38 extending coaxially along the housing 22. A piston 40 carrying an O-ring 42 is in and slidably sealed with the cylinder, and an opposite end 44 of the piston has an enlarged diameter and is slidably received within a cylindrical passage 46 which is also coaxial with the housing. A cap 48 is mounted on an opposite end of the housing by fasteners 50 and has an annular shoulder 52 extending into and circumferentially around an end of the passage. An opening 54 through the shoulder is coaxial with the passage and cylinder.

A calibrated spring 56, which offers progressively increasing resistance to compression, extends between the enlarged piston end 44 and the cap shoulder 52, and a tubular rod or gauge 58 connected to the piston end extends through the spring, the passage 46 and cap opening 54 coaxial therewith. A plurality of graduated markings 60 are spaced along and circumferentially around an outer end of the rod, such that with the spring urging the piston end to the left as viewed in FIG. 5, the graduated markings are within the cap opening inwardly of an outer cap surface 62. However, upon movement of the piston 40 to the right, successive markings are moved beyond the surface.

An outer end 64 of the piston 26 is semicylindrical about an axis corresponding to that of the housing 22, and the housing has a flat surface 66 around the cylinder 24 which is cut into the major diameter housing portion 22a deeper than a flat surface 68 cut into the portion opposite from the surface 66. In use of the gauge 20 to measure clamping forces, for example the forces exerted by jaws 70 and 72 of a 2-jaw chuck or vise as shown in FIG. 2, the jaws are brought together to grip the flat housing surface 68 and the outer end of the piston 26 and force the piston into a cylinder. Forcing the piston into the cylinder places the hydraulic fluid at the closed end 36 of the cylinder under pressure, which pressure is transmitted around the locating pin 34 and through the passage 32 to the fluid in the annular channel 30 to act on the end of the piston 40 and forcefully move it to the right through the cylinder 38 (FIG. 5) to compress the spring 56. The extent of spring compression is in accordance with the pressure of the hydraulic fluid on the piston 40, and therefore in accordance with the clamping force of the jaws, and as the spring is compressed an outer end 74 of the gauge 58 moves outwardly of the cap surface 62 by an amount in accordance with the force. This results in one or more graduated markings 60 being moved outwardly of the cap surface to provide a visual indication of jaw gripping force. It is to be noted that the plane of the flat housing surface 68 extends generally perpendicular to the axis of the piston 26, so that there is no tendency for the piston to bind within the cylinder 24 and accurate measurements are obtained.

FIG. 3 shows the gauge 20 measuring clamping forces exerted by a hydraulic table clamp which includes a hydraulic cylinder 76 coupled to one end of a lever arm 78 pivoted about a fulcrum 80. An opposite end of the lever arm carries a pressure pad 82 adapted to clamp workpieces between it and a pedestal 84, and to measure the clamping force exerted the gauge is positioned between the pressure pad and pedestal and the hydraulic cylinder is actuated, whereupon the force is visually indicated as described in respect of FIG. 2.

Particular advantages are obtained when the gauge 20 is used to measure clamping forces of rotatable 2 and 3-jaw chucks, since it not only enables static clamping forces to be measured when the chucks are stationary, but also dynamic clamping forces when the chucks are rotating and centrifugal force decreases the forces exerted by the jaws. In FIG. 1 the gauge is clamped between jaws 86, 88 and 90 of a rotatable chuck, such that that jaws 86 and 90 engage the curved surface of the housing major diameter portion 22a and the jaw 88 the semicylindrical end 64 of the piston 26, and under static or nonrotating conditions it provides a reading of clamping force in the same manner as described in respect of FIG. 2. However, when the chuck is rotated, because the surface portions of the housing and piston engaged by the chuck jaws have as a common axis the axis of the housing 22, the housing extends coaxial with the axis of rotation of the chuck, rotates with the chuck and the gauge indicates clamping forces and changes in clamping forces due to centrifugal force at various speeds of rotation of the chuck. To that end, since the graduated markings 60 extend circumferentially around the rod 58, despite the fact that the gauge is rotated by the chuck, clear visual readings of clamping pressures may be made.

As is apparent and best shown in FIGS. 4 and 5, for the piston 26 to be gripped and moved inwardly of the cylinder 24 to provide outward movement of the graduated tubular rod 58, the piston must extend partially beyond the flat surface 66 of the housing 22. Provision must therefore be made for a predetermined amount of outward piston extension so that the housing will extend generally coaxial with the axis of rotation of the chuck. Accordingly, the piston is provided with an annular groove 92, the inner edge of which is adjusted to be flush with the flat housing surface 66 when no force is exerted on the piston. To accommodate the adjustment and to compensate for any hydraulic fluid lost from inside the gauge, a compensator screw 94 carrying an O-ring seal 96 is threadably adjustable within a housing passage 98, which passage inwardly of the compensator screw is in communication with the fluid in the cylinder 24. Thus, by rotating the screw in a direction to move it inwardly of the passage, hydraulic fluid is displaced and the piston moved outwardly of the housing, and by rotating the screw in a direction to move it outwardly of the passage, the volume accommodating the fluid is increased for movement of the piston inwardly of the housing, whereby the piston may be adjustably positioned within the cylinder to extend the predetermined amount beyond the flat surface 66. Although the piston will move slightly inwardly of the housing as a result of being gripped by the chuck jaws, in view of the significant difference in the diameters of the pistons 26 and 40, inward movement will be quite small and the substantial coaxial alignment of the housing and axis of rotation of the chuck will not be significantly affected.

It is to be appreciated that since the distance of the housing flat surface 68 from the axis of the housing is less than that of the surface 64 of the piston 26 from the housing axis, if the gauge 20 is used as in FIG. 2 to measure gripping forces exerted by a rotating 2-jaw chuck, then spacers may be placed between the housing flat surface 68 and the jaw 70 to maintain the housing coaxial with the axis of rotation of the chuck. On the other hand, the gauge may be used for such an application without spacers, since in that case the rod 58 would simply be moved through a circle and its graduated markings 60 would still be easily readable.

The invention thus provides an improved gauge of simplified construction for measuring gripping forces of vices, hydraulic table clamps and 2 and 3-jaw chucks. The gauge is adapted for use under either static or rotary dynamic conditions, and when used dynamically the structure and adjustability of the gauge enable accurate gripping force readings to be conveniently made. As compared with chuck gripping force measuring devices of the known type, the gauge is uncomplicated and economical in construction and easy to use without elaborate preparation.

While one embodiment of the invention has been described in detail, various modifications and other embodiments thereof may be devised by one skilled in the art without departing from the spirit and scope of the invention, as defined in the appended claims.

What is claimed is:

1. A gauge for measuring the force exerted by a gripping device, comprising an elongate housing having a first cylinder bore therein toward one end thereof extending generally perpendicularly of said housing between an open end on a surface of and a closed end in said housing; a first piston in and slidably sealed with said cylinder, said piston having an outer end extending out of said cylinder open end; fluid in said cylinder for being pressurized upon forceful movement of said piston into said cylinder; a second cylinder bore in and extending generally longitudinally along said housing in communication at one end thereof with said first cylinder and fluid therein; a second piston in and slidably sealed with said second cylinder, said second piston being moved through said second cylinder away from said first cylinder by pressure of said fluid upon forceful movement of said first piston into said first cylinder; and means for progressively resisting increasing movement of said second piston through said second cylinder, whereby when said first piston outer end and said housing are gripped by the gripping device, the amount of movement of said second piston through said second cylinder is in accordance with the force exerted by the gripping device.

2. A gauge as in claim 1, including indicator means coupled with said piston for providing a visual indication of the amount of movement of said second piston through said second cylinder, and therefore of the force exerted by the gripping device.

3. A gauge as in claim 1, wherein said means for progressively resisting comprises a calibrated spring.

4. A gauge as in claim 3, including a passage in and extending longitudinally along said housing between an opposite end of said second cylinder and an opposite end of said housing, and wherein said indicator means comprises an elongate member coupled at one end with said second piston and extending through said passage for having an opposite end thereof moved out of said passage and beyond said housing opposite end by an amount in accordance with the amount of movement of said second piston, and therefore in accordance with the force exerted by the gripping device, and said spring is disposed in said passage and coupled with at least one of said second piston and elongate member.

5. A gauge as in claim 4, including graduated markings on and along said elongate member opposite end for providing a visual reading of the force exerted by the gripping device.

6. A gauge as in claim 1, including a cylindrical passage in and extending longitudinally along said housing generally coaxial with said second cylinder between an opposite end of said second cylinder and an opposite end of said housing, said passage having a larger diameter than said second cylinder, and an elongate member coupled at one end with said second piston and extending through said passage for having an opposite end thereof moved out of said passage by an amount in accordance with the amount of movement of said second piston in said second cylinder, said member having graduated markings on and along said opposite end thereof for indicating the amount of movement of said member opposite end out of said passage and therefore the force exerted by the gripping device.

7. A gauge as in claim 6, wherein said housing is generally cylindrical, said elongate member is a cylindrical rod extending coaxial with said passage, said graduated markings extend circumferentially around said opposite end of said rod, and said second cylinder, second piston, cylindrical rod and passage extend generally coaxial with said housing, whereby when the gripping device is a rotatable chuck and said first piston outer end and housing are gripped by jaws of the chuck to extend the axes of said housing generally parallel to the axis of rotation of the chuck, upon rotation of the chuck said circumferential graduated markings on said cylindrical rod indicate the gripping force of the chuck jaws at various speeds of rotation of the chuck.

8. A gauge as in claim 7, including an O-ring seal on each of said first and second pistons for slidably sealing the same with said first and second cylinders.

9. A gauge as in claim 6, including an enlarged diameter end on said second piston slidably received in said passage and means defining a radially inwardly extending shoulder in said passage at said housing opposite end and an opening through said shoulder, said one end of said elongate member being coupled with said enlarged diameter piston end and said opposite end thereof extending through said annular shoulder opening, and wherein said means for progressively resisting comprises a calibrated coil spring extending around said elongate member between said annular shoulder and said enlarged diameter piston end.

10. A gauge as in claim 9, wherein said means defining said annular shoulder comprises a cap on said housing opposite end, said cap having a circular opening therethrough coaxial with said passage and an annular ridge around and coaxial with said opening and extending partially into said passage, said annular ridge defining said annular shoulder.

11. A gauge as in claim 9, wherein said housing is generally cylindrical, said elongate member is a cylindrical rod extending coaxial with said passage, said graduated markings extend circumferentially around said rod opposite end and said second cylinder, second piston, rod and passage extend generally coaxial with said housing, whereby when the gripping device is a rotatable chuck and said first piston outer end and housing are gripped by jaws of the chuck to extend the axis of said housing generally parallel to the axis of rotation of the chuck said circumferentially extending graduated markings on said rod are moved to and beyond said housing opposite end to indicate the gripping force of the chuck jaws for various speeds of rotation of the chuck.

12. A gauge as in claim 11, wherein said housing extends generally coaxial with the chuck axis of rotation when the chuck is a 3-jaw chuck and one of the jaws engage said first piston outer end and two of the jaws engage said housing.

13. A gauge as in claim 12, wherein said housing has a flat area on its surface about said first cylinder open end, and including a second passage in said housing between said housing surface and said first cylinder and fluid therein; and compensator means in, sealed with and movable along said second passage to either displace said fluid in said passage and move said first piston outwardly of said housing or to provide an increased volume for said fluid to accommodate movement of said first piston into said housing, whereby said compensator means controls the outward extension of said first piston outer end from said housing so that said housing is coaxial with the axis of rotation of the chuck when said first piston outer end extends a selected amount outwardly from said housing and the chuck is a 3-jaw chuck.

14. A gauge as in claim 13, wherein said first piston outer end is semicylindrical about an axis corresponding to said housing axis when said first piston outer end extends said selected amount outwardly of said housing.

15. A gauge as in claim 1, wherein said first piston has a recessed area therein in communication with said second cylinder and a passage therein extending between said recessed area and an inner end thereof in communication with said inner end of said first cylinder, said passage accommodating transfer of fluid pressure from said inner end of said first cylinder to said recessed area and second cylinder for acting upon and moving said second piston.

16. A gauge for measuring the force exerted by a gripping device, comprising an elongate housing having a cylinder bore toward one end thereof extending generally perpendicularly of said housing between an open end on a surface of and a closed end in said housing; a piston in and slidably sealed with said cylinder, said piston having an outer end extending out of said cylinder open end; a fluid in said cylinder for being pressurized upon forceful movement of said piston into said cylinder; and indicator means carried by said housing and coupled with said fluid for movement of said indicator means generally longitudinally of an opposite end of said housing by an amount in accordance with the pressure of said fluid, whereby when said piston outer end and said housing are gripped by the gripping device, the amount of movement of said indicator means generally longitudinally of said housing opposite end is in accordance with the force exerted by the gripping device.

17. A gauge as in claim 16, wherein said indicator means includes an elongate member and an end of said elongate member is moved longitudinally out of and away from said housing opposite end by an amount in accordance with the pressure of said fluid, and including graduated markings on and along said elongate member end for providing a visual reading of the amount of movement of said elongate member end out of said housing opposite end and therefore of the force exerted by the gripping device.

18. A gauge as in claim 17, wherein said elongate member is a cylindrical rod and said graduated markings are spaced along and extend circumferentially around said rod end.

19. A gauge as in claim 18, wherein the gripping device is rotatable and said housing and rod extend generally longitudinally along the axis of rotation of the gripping device when said piston and housing are gripped thereby, whereby said gauge provides visual indications of the force exerted by the gripping device for various speeds of rotation of the gripping device.

20. A gauge as in claim 19, wherein said housing is generally cylindrical, said rod extends generally coaxial with said housing and said housing and rod extend generally coaxial with the axis of rotation of the gripping device when said piston and housing are gripped thereby.

* * * * *